United States Patent [19]

Saeki et al.

[11] Patent Number: 4,613,649
[45] Date of Patent: Sep. 23, 1986

[54] PROCESS FOR PRODUCING PLASTIC CONCRETE

[75] Inventors: Takashi Saeki; Hideaki Matsuda, both of Kagawa, Japan

[73] Assignee: Okura Kogyo Kabushiki Kaisha, Japan

[21] Appl. No.: 755,194

[22] Filed: Jul. 15, 1985

[30] Foreign Application Priority Data

Jul. 14, 1984 [JP] Japan ................................. 59-145267
Jan. 9, 1985 [JP] Japan ..................................... 60-856

[51] Int. Cl.$^4$ ........................ C04B 25/04; C04B 13/24
[52] U.S. Cl. .................................... 524/650; 523/333; 523/334; 524/801
[58] Field of Search ................ 523/333, 334; 524/650, 524/801

[56] References Cited

U.S. PATENT DOCUMENTS

| | | | |
|---|---|---|---|
| 3,591,542 | 7/1971 | Bonnel et al. | 524/650 |
| 3,892,704 | 7/1975 | Higashimura et al. | 524/650 |
| 4,128,528 | 12/1978 | Frisque et al. | 524/445 |
| 4,500,674 | 2/1985 | Fontana et al. | 524/650 |

FOREIGN PATENT DOCUMENTS

| | | | |
|---|---|---|---|
| 0043726 | 4/1978 | Japan | 524/650 |
| 0039444 | 10/1978 | Japan | 524/650 |
| 0104955 | 8/1980 | Japan | 524/650 |
| 0092564 | 6/1982 | Japan | 524/650 |

*Primary Examiner*—Herbert J. Lilling
*Attorney, Agent, or Firm*—Jacobs & Jacobs

[57] ABSTRACT

A light-weight high-strength plastic concrete is obtained by mixing a nonionic surface active agent having a hydrophilic-lipophilic balance of 3 to 6, a vinyl monomer, and a cement slurry with stirring to form a W/O type emulsion, thereafter polymerizing the vinyl monomer and hardening the cement in the W/O type emulsion simultaneously.

The plastic concrete obtained by the aforesaid process has a smooth surface and the appearance thereof is almost same as that of an ordinary cement concrete. The plastic concrete is also excellent in workability such as cutting, scraping riveting, etc.

15 Claims, No Drawings

PROCESS FOR PRODUCING PLASTIC CONCRETE

FIELD OF THE INVENTION

This invention relates to a process for producing a plastic concrete and, more particularly, to a process for producing a plastic concrete by mixing a nonionic surface active agent having a hydrophilic-lipohilic balance (hereinafter, is referred to as HLB) of 3 to 6, a vinyl monomer, and a cement slurry with stirring to form a W/O type emulsion, thereafter polymerizing the vinyl monomer and hardening the cement in the W/O type emulsion simultaneously.

BACKGROUND OF THE INVENTION

Hitherto, as a process for producing a plastic concrete, there is a well-known process wherein a cement mortar obtained by kneading an aggregate, water, etc., is mixed with a rubber latex of styrene butadiene rubber, nitrile rubber, etc.; a O/W type emulsion of polyvinyl acetate, an epoxy resin, etc.; or a water-soluble polymer such as polyvinyl alcohol, carboxymethyl cellulose, etc., and it is said that the plastic concrete obtained by the aforesaid process is excellent in waterproofing property and has improved bending strength, tensile strength, shock resistance, and abrasion resistance. Furthermore, a resin concrete obtained by consolidating an aggregate with an unsaturated polyester resin, an epoxy resin, etc., is known. However, these concretes have a disadvantage that the specific gravity is generally high. On the other hand, as a process for reducing weight of cement concrete, there are known a process of mixing a cement slurry with a light-weight aggregate and a process of introducing foams into a cement slurry using a foaming agent. As the process of using a foaming agent, there are a process of curing a cement slurry in a foamed state using a surface active agent and a process of mixing a cement slurry with an aluminum powder to cause a chemical reaction of aluminum and the cement and to foam by the hydrogen gas thus generated. In general, a process of using a foaming agent has a large disadvantageous that it is difficult to control the foaming state and thus the foamed state becomes nonuniform. Furthermore, in the case of producing a large concrete body, the foamed state is liable to become coarser in the upper portion thereof than in the lower portion to provide density difference in the concrete body. Also, in general, the size of foams is large, which reduces the appearance of the product. On the other hand, according to the process of using a light-weight aggregate, it is difficult to obtain a high strength light-weight concrete having a specific gravity of lower than 1.0.

As a process of increasing the physical performance of light-weight concrete, a polymer-impregnated concrete has been proposed. According to the process, a base material for light-weight concrete is impregnated with a vinyl monomer and the vinyl monomer is polymerized. The mechanical strength of the light-weight concrete obtained by such a process is remarkably higher than that of a concrete made of the base material as well as the elasticity, the chemical resistance, the freezing and thawing resistance, etc., of the concrete are improved but the polymer-impregnated concrete obtained by the above-described process has various problems in the producibility. That is, first, for effectively increasing the strength of the polymer-impregnated concrete, it is required to previously dry the base material so that the water content thereof is below 0.5%. Second, a radiation is required for the polymerization of a monomer impregnated in the concrete and it the polymerization of the vinyl monomer in the concrete is performed by a thermal polymerization, the loss of the vinyl monomer becomes large, which is uneconomical. Third, the working step for producing the concrete is complicated. These factors increase the production cost of the polymer-impregnated concrete and refuse the practical employment of the process.

SUMMARY OF THE INVENTION

As the result of various investigations for solving the above-described various problems and effectively producing a light-weight high-strength plastic concrete, the inventors have succeeded in obtaining a light-weight high-strength plastic concrete with a high efficiency by mixing a nonionic surface active agent having HLB of 3 to 6, a vinyl monomer, and a cement slurry with stirring to form a W/O type emulsion, thereafter polymerizing the vinyl monomer, and hardening the cement in the W/O type emulsion simultaneously, followed by, if desired, drying. The feature of this invention is in the point of discovering the novel process for producing a plastic concrete by utilizing a W/O type emulsion, which has never been used for the purpose, and thus producing a light-weight plastic concrete having improved properties by the introduction of a vinyl monomer.

DESCRIPTION OF THE PREFERRED EMBODIMENT

In this invention, a W/O type emulsion is produced by adding a cement slurry to a solution of a nonionic surface active agent having HLB of 3 to 6 in a vinyl monomer followed by stirring.

As the nonionic surface active agent having HLB of 3 to 6, which is used for producing the W/O type emulsion, there are, for example, sorbitan sesquioleate, glycerol monostearate, sorbitan monooleate, diethylene glycol monooleate, diethylene glycol monostearatate, sorbitan monostearate, polyglycerol monooleate, etc. In the case of using the nonionic surface active agent solely, sorbitan monooleate and polyglycerol monooleate are preferred. Also, these nonionic surface active agents may be used as a mixture thereof so that a desired HLB value is obtained. If a nonionic surface active agent having HLB lower than 3 is used, the production of the W/O type emulsion is difficult while if the HLB value is over 6, the production of the W/O type emulsion may be possible but cracks occur at the polymerization of the vinyl monomer in the emulsion, whereby good moldings cannot be obtained. There is no particular restriction on the amount of the surface active agent but the proper amount of the surface active agent is about 5 to 100 parts by weight to 100 parts by weight of the vinyl monomer.

It is preferred that the vinyl monomer which is used for producing the W/O type emulsion in this invention is a water-insoluble vinyl monomer which is in a liquid state at normal temperature. Examples of the vinyl monomer are a styrene, an α-methylstyrene, an acrylic acid ester, a methacrylic acid ester, an acrylonitrile, a divinylbenzene, an acrylic acid ester of alkylene glycol, a dimethacrylic acid ester of alkylene glycol, an acrylic acid ester of a polyhydric alcohol, a methacrylic acid ester of a polyhydric alcohol, etc. These monomers may be used solely or as a mixture thereof. In this case, it is preferred for increasing the heat resistance and other properties of the vinyl polymer to use a divinyl compound or a trivinyl compound, such as ethylene glycol dimethacrylate, trimethylolpropane trimethacrylate, etc., together with the aforesaid vinyl monomer.

There is no particular restriction about cement which is used for producing the cement slurry in this invention and there are Portland cement, Portland blast-furnace slag cement, Portland fly-ash cement, Portland pozzolan cement, magnesia cement, alumina cement, etc. The cement slurry is produced by mixing well cement and water. There is no particular restriction on the weight ratio of cement and water but it is desirable that the cement to water (cement/water) weight ratio is about 100 : 40 to 100 : 500.

The W/O type emulsion thus obtained is cured by polymerizing the vinyl monomer in the emulsion and got polymerizing the vinyl monomer, a polymerization catalyst is used. As the polymerization catalyst, a radical-forming agent or a redox catalyst may be used. The polymerization temperature is usually room temperature to 100° C. but a temperature higher than 100° C. be employed as the case may be. When the polymerization temperature is higher than 100° C., it is preferred to perform the polymerization under high pressure for preventing boiling of water.

In this invention, in case of polymerizing the vinyl monomer, cement is hardened by an ordinary cement hardening process. In this case for effectively hardening cement, the cement may be heated in saturated steam. Also, if necessary, super high early strength cement or a quick bonding agent may be used in this invention.

After polymerizing the vinyl monomer and hardening the cement by the manners described above, the hardened cement is dried to volatile off water therefrom to provide a light-weight plastic concrete but according to the use, the cement may be used as a water-containing hardened product without drying.

The primary feature of the light-weight plastic concrete obtained by the process of this invention is that the foamed structure is fine and uniform. Therefore, the plastic concrete has an appearance like an ordinary cement concrete and has a smooth surface state. Also, even when a large molded concrete product is produced by the process of this invention, there is no density difference between the upper portion and the lower portion of the product. This is because water is filled in the foamed cells.

The second feature of this invention is in the point that the specific gravity of the concrete product can be desirably controlled by controlling the amount of water added to the cement. That is, if the amount of water added to cement is increased in the case of producing the cement slurry, the specific gravity of the plastic concrete obtained becomes lower and if the amount of water is reduced, the specific gravity becomes higher.

The third feature of this invention is in the point that organic or inorganic fibers, a filler, a light-weight aggregate, etc., can be easily mixed with the W/O type emulsion thus formed. In particular, by mixing organic fibers with the W/O type emulsion, a light-weight plastic concrete having a high strength can be produced.

The fourth feature of this invention is in the point that various moldings and tabular products having various shapes can be obtained by casting using various molds or by extrusion molding using various extruding machines.

The fifth feature of this invention is in the point that the light-weight plastic concrete obtained by the process of this invention is excellent in workability such as cutting, scraping, riveting, etc.

As described above, the plastic concrete obtained by the process of this invention has various excellent properties and thus can be industrially used as very useful elements.

Then, the invention will further be explained more practically by the following examples.

EXAMPLE 1

A vinyl monomer solution was prepared by dissolving 50 parts by weight of sorbitan monooleate having HLB of 4.3 in 90 parts by weight of styrene and 10 parts by weight of trimethylolpropane trimethacrylate and then mixed with 3600 parts by weight of a cement slurry obtained by mixing 1,500 parts by weight of Portland cement and 2,100 parts by weight of water followed by stirring to provide a viscous W/O type emulsion. Then, 4.5 parts by weight of t-butyl peroxybenzoate was added to the W/O type emulsion thus formed as a polymerization initiator followed by stirring well, the mixture was placed in a mold, and after polymerizing the vinyl monomer for 20 hours at 60° C., the molded product was withdrawn from the mold and cured for 7 days in a chamber maintained at a constant temperature of 60° C. and a constant humidity of 100% RH to harden the cement. When the water-containing hardened product thus obtained was dried, a light-weight plastic concrete having a specific gravity of 0.8 was obtained. The appearance of the light-weight plastic concrete thus obtained was uniform and almost same at that of a cement concrete hardened product. Also, sawing and cutting could be easily applied to the concrete product.

EXAMPLE 2

A vinyl monomer solution was prepared by dissolving 25 parts by weight of sorbitan monooleate in 90 parts by weight of styrene and 10 parts by weight of trimethylolpropane trimethacrylate and was mixed with 3,750 parts by weight of a cement slurry obtained by mixing 1,250 parts by weight of Portland cement and 2,500 parts by weight of water followed by stirring to provide a viscous W/O type emulsion. After adding thereto 3.4 parts by weight of t-butyl peroxybenzoate as a polymerization initiator followed by stirring well, the mixture was placed in a mold and after polymerizing the vinyl monomer for 20 hours at 60° C., the product was withdrawn from the mold and cured for 7 days in a chamber maintained at a constant temperature of 60° C. and a constant humidity of 100% RH to harden the cement. When the water-containing hardened product thus obtained was dried, a light-weight plastic concrete having a specific gravity of 0.56 was obtained. The appearance of the light-weight plastic concrete was uniform and almost same as that of an ordinary cement concrete hardened product. Also, sawing and cutting could be easily applied to the hardened product.

EXAMPLE 3

A vinyl monomer solution was prepared by dissolving 50 parts by weight of sorbitan monooleate in 90 parts by weight of styrene and 10 parts by weight of trimethylolpropane trimethacrylate and was mixed with 4,500 parts by weight of a cement slurry obtained by mixing 1,500 parts by weight of Portland cement and 3,000 parts by weight of water followed by stirring to provide a viscous W/O type emulsion. In the emulsion were dispersed well 47 parts by weight of polyacrylonitrile fibers having a length of 6 mm and a diameter of 18 μm and after adding thereto 6 parts by weight of t-butyl peroxyisobutyrate as a polymerization initiator followed by stirring, the mixture was placed in a mold and after polymerizing the vinyl monomer for 20 hours at 60° C., the product was withdrawn from the mold and cured for 7 days in a chamber maintained at a constant temperature of 60° C. and a constant humidity of 100% RH to harden the cement. When the water-containing hardened product thus obtained was dried, a light-weight plastic concrete having a specific gravity of 0.59 was obtained. The appearance of the light-weight plastic concrete was uniform and sawing and cutting could be easily applied to the hardened product.

EXAMPLE 4

A vinyl monomer solution was prepared by dissolving 50 parts by weight of sorbitan monooleate in 60 parts by weight of styrene, 30 parts by weight of methyl methacrylate, and 10 parts by weight of trimethylolpropane trimethacrylate and mixed with a cement slurry obtained by mixing 600 parts by weight of Portland cement and 1,200 parts by weight of water followed by stirring to provide a viscous W/O type emulsion. Then, after adding thereto 4.5 parts by weight of t-butyl peroxybenzoate as a polymerization initiator followed by stirring well, the mixture was placed in a mold. After polymerizing the vinyl monomer for 20 hours at 60° C., the product was withdrawn from the mold and cured for 7 days in a chamber maintained at a constant temperature of 60° C. and a constant humidity of 100% RH followed by drying to provide a light-weight plastic concrete having a specific gravity of 0.56. The appearance of the light-weight plastic concrete was uniform and sawing and cutting could be easily applied to the hardened product.

EXAMPLE 5

A vinyl monomer solution was prepared by dissolving 25 parts by weight of diglycerol monooleate having HLB of 5.7 in 95 parts by weight of stryene and 5 parts by weight of trimethylolpropane trimethacrylate and mixed with 3,375 parts by weight of a cement slurry obtained by mixing 1,125 parts by weight of Portland cement and 2,250 parts by weight of water followed by stirring to provide a viscous W/O type emulsion. After adding thereto 1.25 parts by weight of t-butyl peroxybenzoate as a polymerization initiator followed by stirring well, the mixture was placed in a mold and after polymerizing the vinyl monomer for 20 hours at 60° C., the product was withdrawn from the mold and cured for 7 days in a chamber maintained at a constant temperature of 60° C. and a constant humidity of 100% RH to harden the cement. When the water-containing hardened product thus obtained was dried, a light-weight plastic concrete having a specific gravity of 0.57 was obtained. The appearance of the light-weight plastic concrete was uniform and almost same as that of an ordinary cement concrete hardened product. Also, sawing and cutting could be easily applied to the hardened product.

EXAMPLE 6

A vinyl monomer solution was prepared by dissolving 33 parts by weight of diglycerol monooleate in 95 parts by weight of styrene and 5 parts by weight of trimethylolpropane trimethacrylate and mixed with 3,591 parts by weight of a cement slurry obtained by mixing 1,197 parts by weight of Portland cement and 2,394 parts by weight of water followed by stirring to provide a viscous W/O type emulsion. In the emulsion were dispersed well 37 parts by weight of polyacrylonitrile fibers having a length of 6 mm and a diameter of 18 μm and after adding thereto 1.33 parts by weight of t-butyl peroxyisobutyrate as a polymerization initiator followed by stirring, the mixture was placed in a mold. Then, after polymerizing the vinyl monomer for 5 hours at 60° C., the product was withdrawn from the mold and cured for 48 hours in a chamber maintained at a constant temperature of 90° C. and a constant humidity of 100% RH to harden the cement. When the water-containing hardened product thus obtained was dried, a light-weight plastic concrete having a specific gravity of 0.63 was obtained. The appearance of the light-weight plastic concrete was uniform and sawing, cutting and riveting could be easily applied to the hardened product.

EXAMPLE 7

A vinyl monomer solution was prepared by dissolving 33 parts by weight of diglycerol monooleate in 95 parts by weight of styrene and 5 parts by weight of trimethylolpropane trimethacrylate and mixed with 4,389 parts by weight of a cement slurry obtained by mixing 1,463 parts by weight of Portland cement and 2,926 parts by weight of water followed by stirring to provide a viscous W/O type emulsion. In the emulsion were dispersed well 45 parts by weight of polyacrylonitrile fibers having a length of 12 mm and a diameter of 18 μm and after adding thereto 33 parts by weight of t-butyl peroxybenzoate as a polymerization initiator followed by stirring, the mixture was placed in a mold. Then, after polymerizing and hardening for 3 weeks at room temperature, the hardened product was withdrawn from the mold and dried to provide a light-weight plastic concrete having a specific gravity of 0.63. The appearance of the light-weight plastic concrete was uniform and sawing, cutting, and riveting could be easily applied to the hardened product.

EXAMPLE 8

A vinyl monomer solution was prepared by dissolving 33 parts by weight of diglycerol monooleate in 80 parts by weight of styrene, 15 parts by weight of acrylonitrile and 5 parts by weight of trimethylolpropane trimethacrylate and mixed with 3,591 parts by weight of a cement slurry obtained by mixing 1,197 parts by weight of Portland cement and 2,394 parts by weight of water followed by stirring to provide a viscous W/O type emulsion. After dispersing 133 parts by weight of perlite as a light-weight aggregate in the emulsion, 1.33 parts by weight of t-butyl peroxybenzoate was added to the emulsion followed by stirring well. The mixture was placed in a mold and after polymerizing the vinyl monomer for 24 hours at 60° C. and for 24 hours at 90° C., the product was withdrawn from the mold and dried to provide a light-weight plastic concrete having a specific gravity of 0.45. Sawing and cutting could be easily applied to the plastic concrete.

Comparison Example 1

A cement slurry obtained by mixing 100 parts by weight of Portland cement and 273 parts by weight of water was mixed with 109 parts by weight of perlite as a light-weight aggregate and after curing the mixture for 7 days in a chamber maintained at a constant temperature of 60° C. and a constant humidity of 100% RH to harden the cement, the product was dried to provide a light-weight concrete having a specific gravity of 0.55.

Comparison Example 2

A mixture of 100 parts by weight of Portland cement, 40 parts by weight of water, and 24 parts by weight of styrene beads as a light-weight aggregate was cured and hardened for 7 days in a chamber maintained at a constant temperature of 60° C. and a constant humidity of 100% RH and then dried to provide a light-weight concrete having a specific gravity of 0.50.

Comparison Example 3

When the same procedure as Example 2 using sorbitan trioleate having HLB of 1.8 in place of sorbitan monooleate, a W/O type emulsion could not be formed.

Comparison Example 4

When the same procedure as Example 2 was followed using sorbitan palmitate having HLB of 6.7 in place of sorbitan monooleate, a viscous W/O type emulsion was obtained. After adding thereto 3.4 parts by weight of t-butyl peroxybenzoate as a polymerization initiator followed by stirring well, the mixture was placed in a mold and after polymerizing for 20 hours at 60° C., the product was withdrawn from the mold. In this case, a severe shrinkage accompanied by cracks was observed on the product.

Comparison Example 5

When the same procedure as Example 2 was followed using sorbitan monolaurate having HLB of 8.6 in place of sorbitan monooleate, a W/O type emulsion was formed but cracks and shrinkage occured on the polymerized product of the emulsion and the strength thereof was very low.

The properties of the light-weight concretes obtained in the examples and the comparison examples described above are shown in Table 1.

TABLE 1

| | Properties of light-weight concrete | | |
|---|---|---|---|
| | Specific gravity | Bending strength (kg/cm$^2$) | Compressive strength (kg/cm$^2$) |
| Example 1 | 0.80 | 25.2 | 112.0 |
| Example 2 | 0.56 | 19.9 | 37.3 |
| Example 3 | 0.59 | 45.2 | 51.8 |
| Example 4 | 0.56 | 29.2 | 35.2 |
| Example 5 | 0.57 | 19.5 | 50.0 |
| Example 6 | 0.63 | 62.4 | 44.7 |
| Example 7 | 0.63 | 44.7 | 43.9 |
| Example 8 | 0.45 | 16.1 | 35.4 |
| Comparison Example 1 | 0.55 | 6.3 | 15.4 |
| Comparison Example 2 | 0.50 | 4.1 | 13.5 |
| ALC* | 0.50 | 10.0 | 40.0 |

*Autoclaved light-weight concrete (Catalog values by Nippon Iton Kogyo K. K.)

What is claimed is:

1. A process for producihg a plastic concrete which comprises mixing a nonionic surface active agent having a hydrophilic-lipophilic balance of 3 to 6, a vinyl monomer, and a cement slurry with stirring to form a W/O type emulsion, thereafter polymerizing the vinyl monomer and hardening the cement in said W/O type emulsion simutaneously.

2. The process for producing a plastic concrete as claimed in claim 1, wherein the nonionic surface active agent having a hydrophilic-lipophilic balance of 3 to 6 is sorbitan sesquioleate, glycerol monostearate, sorbitan monooleate, diethylene glycol monooleate, diethylene glycol monostearate, sorbitan monostearate, or polyglycerol monooleate.

3. The process for producing a plastic concrete as claimed in claim 1, wherein the vinyl monomer is styrene, α-methylstyrene, an acrylic acid ester, a methacrylic acid ester, acrylonitrile, divinylbenzene, an acrylic acid ester of an alkylene glycol, a dimethacrylic acid ester of an alkylene glycol, an acrylic acid ester of a polyhydric alcohol or a methacrylic acid ester of a polyhydric alcohol.

4. The process for producing a plastic concrete as claimed in claim 1, wherein the amount of the nonionic surface active agent having a hydrophilic-lipophilic balance of 3 to 6 is 5 to 100 parts by weight per 100 parts by weight of the vinyl monomer.

5. The process for producing a plastic concrete as claimed in claim 1, wherein trimethylolpropane trimethacrylate is used in addition to the vinyl monomer.

6. The process for producing a plastic concrete as claimed in claim 1, wherein the cement is Portland cement, Portland blast-furnace slag cement, Portland fly-ash cement, Portland pozzolan cement, almina cement, or magnesia cement.

7. The process for producing a plastic concrete as claimed in claim 1, wherein the compounding ratio of the cement and water is 40 to 500 parts by weight of water to 100 parts by weight of the cement.

8. The process for producing a plastic concrete as claimed in claim 1, wherein the W/O type emulsion further contain organic or inorganic fibers.

9. The process for producing a plastic concrete as claimed in claim 1, wherein the W/O type emulsion further contain light-weight aggregates.

10. The process for producing a plastic concrete as claimed in claim 1, wherein the polymerization of the vinyl monomer is performed using a polymerization initiator.

11. The process for producing a plastic concrete as claimed in claim 9, wherein the polymerization initiator is t-butyl peroxybenzoate or t-butyl peroxyisobutyrate.

12. The process for producing a plastic concrete as claimed in claim 1, wherein the cement is hardened by heating it in saturated steam.

13. The process for producing a plastic concrete as claimed in claim 3, wherein trimethylolpropane trimethacrylate is used in addition to the vinyl monomer.

14. The process for producing a plastic concrete as claimed in claim 4, wherein trimethylolpropane trimethacrylate is used in addition to the vinyl monomer.

15. The process for producing a plastic concrete as claimed in claim 6, wherein the compounding ratio of the cement and water is 40 to 500 parts by weight of water to 100 parts by weight of the cement.

* * * * *